Patented Aug. 16, 1949

2,479,152

UNITED STATES PATENT OFFICE 2,479,152

1,1'-DIALKYL-3,3'-ALKYLENEBENZIMI-DAZOLOCYANINE SALTS

Leslie G. S. Brooker, Rochester, N. Y., assignor to Eastman Kodak Company, Rochester, N. Y., a corporation of New Jersey No Drawing. Application August 17, 1945, Serial No. 611,240

6 Claims. (Cl. 260—240)

This invention relates to 1,1'-dialkyl-3,3'-alkylene-benzimidazolocyanine salts and to a process for preparing the same.

It is shown in the copending application of Leslie G. S. Brooker and Robert H. Sprague, Serial No. 563,086, filed November 11, 1944 (of which the instant application is a continuation-in-part) that N,N'-alkylenecyanine p-toluenesulfonates, e. g. N,N'-alkylenethiacyanine p-toluenesulfonates, can be prepared by reacting with an alkylene salt of the following general formula:

$$X-(CH_2)_n-X'$$

wherein $n$ represents a positive integer of from 2 to 3, and X and X' each represents an aryl sulfonate radical, upon a heterocyclic base derivative of methane of the following general formula:

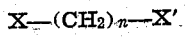

wherein Z and Z' each represents the non-metallic atoms necessary to complete a heterocyclic nucleus containing 5 to 6 atoms in the heterocyclic ring, followed by reacting upon the resulting hydro salt with an acid-binding agent.

It is an object of the present invention to provide 1,1'-dialkyl-3,3'-alkylenebenzimidazolocyanine salts in which the alkylene group contains from 2 to 3 carbon atoms and also to provide 1,1'-dialkyl-3,3'-methylenebenzimidazolocyanine salts by means of a different process. Other objects will become apparent hereinafter.

In accordance with my invention I provide the 1,1'-dialkyl-3,3'-alkylenebenzimidazolocyanine salts (dyes) which are represented by the following general formula:

I.

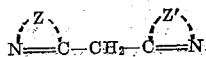

wherein D represents an o-phenylene group substituted or unsubstituted, $n$ represents a positive integer of from 1 to 3, R represents an alkyl group, and X represents an anion.

The salts, wherein $n$ represents a positive integer of from 2 to 3, are prepared in accordance with my invention, by reacting with an alkylene salt of the following general formula:

II.  $$X-(CH_2)_n-X'$$

wherein X and X' each represents an aryl sulfonate radical, and $n$ represents a positive integer of from 2 to 3, upon a heterocyclic base derivative of methane of the following general formula:

III.

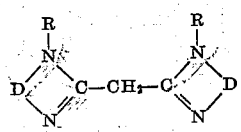

wherein D represents an o-phenylene group and R represents an alkyl group, followed by reacting upon the resulting hydro salt with an acid-binding agent. This process can be illustrated schematically for the preparation of 1,1'-diethyl-3,3'-ethylenebenzimidazolocyanine p-toluenesulfonate as follows:

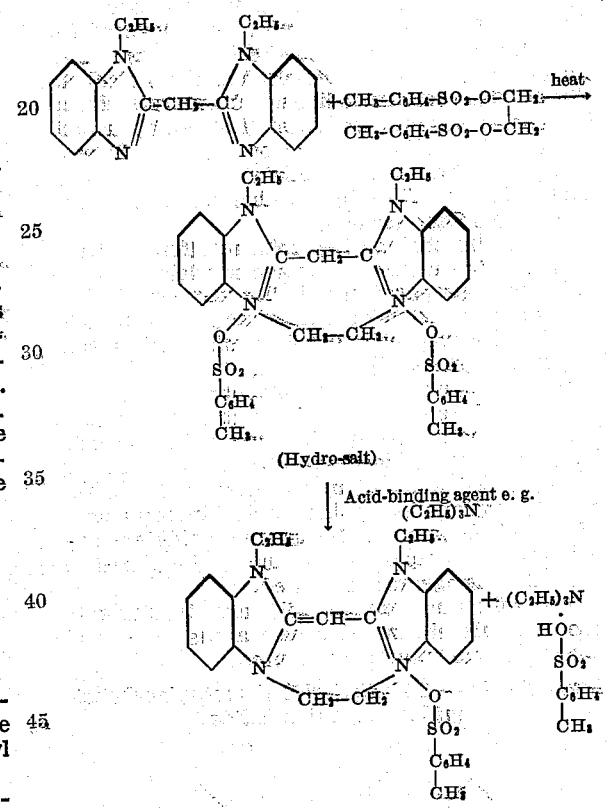

The N,N'-alkylene arylsulfonates so formed are advantageously converted to the more insoluble cyanine iodides to facilitate isolation from the reaction mixture, by treatment with sodium or potassium iodide. The cyanine bromides and perchlorates can be similarly obtained.

The heterocyclic base derivative of methane is advantageously heated with the alkalene aryl sulfonate at from 150 to 200° C., although higher or lower temperatures can be used. The acid-binding agent employed to convert the hydro salt to the N,N'-alkylene cyanine salt can be a strong organic base, such as a trialkylamine, a dialkylamine, a N-alkylpiperidine, sodium hydroxide, sodium carbonate, ammonia or other acid-binding agent. As alkylene arylsulfonates, alkylene-p-toluenesulfonates are advantageously employed, although alkylene benzene sulfonates and other alkylene aryl sulfonates can be employed.

The following examples will serve to illustrate further my new salts and the manner of obtaining the same.

*Example 1.—1,1'-diethyl-3,3'-ethylenebenzimidazolocyanine iodide*

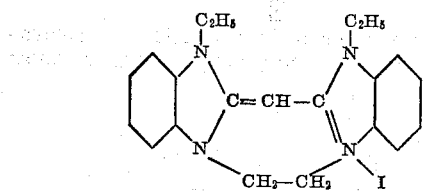

3 g. (1 mol.) of di-1-ethylbenzimidazolylmethane was mixed with ethylene-p-toluenesulfonate (3.8 g., 1 mol.) and the mixture was heated at 110° C. (oil bath). Vigorous reaction occurred, after which heating was continued at 165° C. for 1 hour. The cooled reaction mixture was dissolved in ethyl alcohol and to the solution was added sodium hydroxide. The ethylenecyanine dye separated from the solution. The dye was filtered off, washed with water and dissolved in hot ethyl alcohol. To the hot solution was added 1.5 g. of sodium iodide dissolved in ethyl alcohol. The ethylene cyanine iodide which separated from the cooled mixture was filtered off and purified by recrystallization from ethyl alcohol. It was obtained as tan crystals having a melting point about 325° C. Its ethyl alcohol solution had a strong blue fluorescence.

Using trimethylene di-p-toluenesulfonate, 1,1'-diethyl-3,3'-trimethylenebenzimidazolocyanine iodide can be prepared in a similar manner. Using di-1-methylbenzimidazolylmethane, 1,1'-dimethyl-3,3'-ethylenebenzimidazolocyanine iodide can be prepared in a similar manner.

In accordance with my invention, I prepare 3,3'-methylenebenzimidazolocyanine salts by reacting a methylene halide upon a heterocyclic base derivative of methane of the above general Formula III, followed by reacting upon the resulting hydrohalide with an acid-binding agent. Methylene bromide or methylene iodide are advantageously employed and any of the aforesaid acid-binding agents can be used.

The following example will serve to illustrate the methylenebenzoimidazolocyanine salts and the manner of obtaining the same.

*Example 2. — 1,1'-diethyl-3,3'-methylenebenzimidazolocyanine iodide*

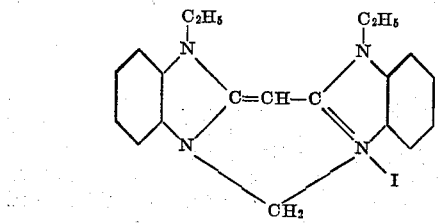

3 g. (1 mol.) of di-1-ethylbenzimidazolyl methane were mixed with methylene iodide (1.2 cc., 1 mol. + 100% excess) in a large diameter test tube and heated over a free flame with stirring. The reaction proceeded smoothly. The cooled reaction mass was dissolved in methyl alcohol and aqueous caustic soda solution was added until the solution was alkaline. The methylene benzimidazolocyanine iodide separated out (0.75 g.). It was filtered off, washed with water and recrystallized from ethyl alcohol. It was obtained as pale yellow crystals melting above 320° C. Its ethyl alcohol solution was nearly colorless with a strong blue fluorescence.

Using di-1-methylbenzimidazolylmethane, 1,1'-dimethyl-3,3'-methylenebenzimidazolocyanine iodide can be prepared.

The di-1-ethylbenzimidazolylmethane used in the foregoing examples can be prepared as illustrated in the following example.

*Example 3.—Di-1-ethylbenzimidazolylmethane*

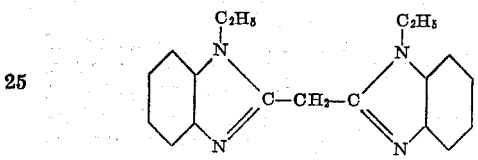

13.6 g. (2 mol.) of N-ethyl-o-phenylenediamine (Hempel, J. prakt. Chem. 41, 164 (1890); 39, 199 (1889)) were mixed with 8 g. (1 mol.) of ethyl malonate and the mixture heated gently under reflux for 2 hours. The cooled solid reaction mixture was purified by recrystallization from ligroin (B. P. 90–120° C.). The compound had the above formula and melted at 107 to 117° C. with shrinking from 103° C.

Similarly di-1-methylbenzimidazolylmethane can be prepared using N-methyl-o-phenylenediamine.

The herein-described salts can be employed in the manufacture of optical filters useful in photography.

What I claim as my invention and desire to be secured by Letters Patent of the United States is:

1. The alkylene benzimidazolocyanine salts which are represented by the following general formula:

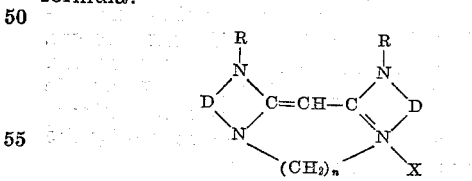

wherein D represents an o-phenylene group, R represents an alkyl group, X represents an anion, and n represents a positive integer of from 1 to 3.

2. The alkylene benzimidazolocyanine salts which are represented by the following general formula:

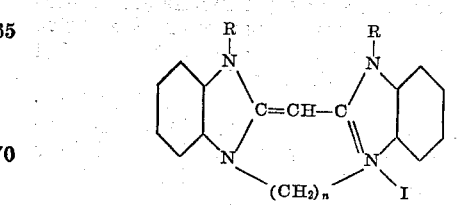

wherein R represents an alkyl group containing from 1 to 2 carbon atoms and n represents a positive integer of from 1 to 3.

3. The alkylene benzimidazolocyanine salt of the following formula:

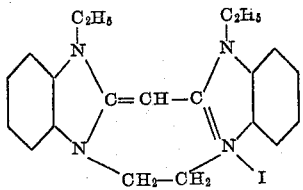

4. The alkylene benzimidazolocyanine salt of the following formula:

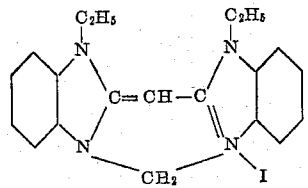

5. The alkylene benzimidazolocyanine salts of the following general formula:

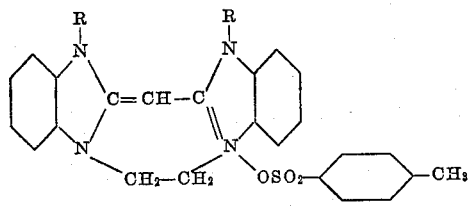

wherein R represents an alkyl group containing from 1 to 2 carbon atoms.

6. The alkylene benzimidazolocyanine salts which are represented by the following general formula:

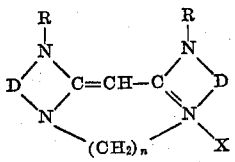

wherein D represents an o-phenylene group, R represents an alkyl group containing from 1 to 2 carbon atoms, X represents an anion and $n$ represents a positive integer of from 1 to 3.

LESLIE G. S. BROOKER.

REFERENCES CITED

The following references are of record in the file of this patent:

UNITED STATES PATENTS

| Number | Name | Date |
|---|---|---|
| 2,265,907 | Kendal | Dec. 9, 1941 |
| 2,320,654 | Reister | June 1, 1943 |
| 2,393,351 | Wilson | Jan. 22, 1946 |

OTHER REFERENCES

Scheiber Berichte 59, pages 502–508.